(12) United States Patent
McFadden

(10) Patent No.: US 9,351,495 B2
(45) Date of Patent: May 31, 2016

(54) AIR FRYER

(75) Inventor: David H. McFadden, Lexington, MA (US)

(73) Assignee: TurboChef Technologies, Inc., Atlanta, GA (US)

( * ) Notice: Subject to any disclaimer, the term of this patent is extended or adjusted under 35 U.S.C. 154(b) by 1109 days.

(21) Appl. No.: 11/908,169

(22) PCT Filed: Mar. 14, 2006

(86) PCT No.: PCT/US2006/009075
§ 371 (c)(1),
(2), (4) Date: Sep. 10, 2007

(87) PCT Pub. No.: WO2006/099394
PCT Pub. Date: Sep. 21, 2006

(65) Prior Publication Data
US 2008/0206420 A1    Aug. 28, 2008

Related U.S. Application Data

(63) Continuation of application No. 11/098,280, filed on Apr. 4, 2005, now Pat. No. 7,360,533, and a continuation-in-part of application No. 11/098,280, and a continuation of application No. 10/614,479, filed (Continued)

(30) Foreign Application Priority Data

Oct. 5, 2005    (WO) ................ PCT/US2005/035605

(51) Int. Cl.
*A47J 37/07*    (2006.01)
*A21B 1/24*    (2006.01)

(Continued)

(52) U.S. Cl.
CPC ............... *A21B 1/245* (2013.01); *A23L 1/0114* (2013.01); *A23L 1/0128* (2013.01); *A23L 1/0135* (2013.01); *A47J 39/003* (2013.01)

(58) Field of Classification Search
USPC ....... 99/326–333, 403–418, 357, 443 R–450, 99/477, 473, 494, 485, 345, 339, 325, 99/348; 126/391.1, 21 A, 377.1, 376.1, 126/378.1; 219/430, 385, 681; 426/438, 426/523
See application file for complete search history.

(56) References Cited

U.S. PATENT DOCUMENTS 2,563,253 A    8/1951    Levin
2,704,802 A    3/1955    Blass et al.
(Continued)

FOREIGN PATENT DOCUMENTS

CN    2348616    11/1999
DE    2557867    6/1977
(Continued)

OTHER PUBLICATIONS

U.S. Appl. No. 11/928,037, filed Oct. 30, 2007, McFadden.
(Continued)

*Primary Examiner* — Thien S Tran
(74) *Attorney, Agent, or Firm* — Kilpatrick Townsend & Stockton LLP; Dean W. Russell; Kristin M. Crall

(57) ABSTRACT

An accelerated cooking air fryer is disclosed comprising a cavity, controller, thermal heating source, blower assembly, gas directing means and a vent assembly. Hot gas is circulated by the blower motor assembly into the air fryer cavity where the hot air is directed in a manner wherein a conflicting, colliding turbulent gas flow is directed at a food product providing for the accelerated cooking of the food product.

18 Claims, 5 Drawing Sheets

Related U.S. Application Data on Jul. 7, 2003, now Pat. No. 6,874,495, and a continuation-in-part of application No. 10/614,268, filed on Jul. 7, 2003, now Pat. No. 7,836,874, and a continuation-in-part of application No. 10/614,532, filed on Jul. 7, 2003, now Pat. No. 8,297,270, and a continuation-in-part of application No. 10/614,710, filed on Jul. 7, 2003, now Pat. No. 7,055,518.

(60) Provisional application No. 60/661,591, filed on Mar. 14, 2005, provisional application No. 60/615,888, filed on Oct. 5, 2004, provisional application No. 60/614,877, filed on Sep. 30, 2004, provisional application No. 60/394,216, filed on Jul. 5, 2002.

(51) Int. Cl.
*A23L 1/01* (2006.01)
*A47J 39/00* (2006.01)

(56) References Cited

U.S. PATENT DOCUMENTS

| | | | |
|---|---|---|---|
| 3,210,511 A | 10/1965 | Smith | |
| 3,548,152 A | 12/1970 | Klepzig | |
| 3,581,038 A | 5/1971 | Williams | |
| 3,813,216 A | 5/1974 | Baur et al. | |
| 3,828,760 A | 8/1974 | Farber et al. | |
| 3,973,551 A | 8/1976 | Caselani et al. | |
| 3,991,737 A | 11/1976 | Del Febbro | |
| 4,001,451 A * | 1/1977 | Veeneman et al. | 426/438 |
| 4,154,861 A | 5/1979 | Smith | |
| 4,160,144 A | 7/1979 | Kashyap et al. | |
| 4,160,145 A | 7/1979 | Rueggeberg | |
| 4,283,614 A | 8/1981 | Tanaka et al. | |
| 4,327,279 A | 4/1982 | Guibert | |
| 4,337,384 A | 6/1982 | Tanaka et al. | |
| 4,338,911 A | 7/1982 | Smith | |
| 4,350,504 A | 9/1982 | Diachuk | |
| 4,354,083 A | 10/1982 | Staats | |
| 4,409,453 A | 10/1983 | Smith | |
| 4,431,889 A | 2/1984 | Saponara et al. | |
| 4,439,459 A * | 3/1984 | Swartley | 426/438 |
| 4,455,924 A * | 6/1984 | Wenzel | 99/333 |
| 4,464,554 A | 8/1984 | Bakanowski et al. | |
| 4,480,164 A | 10/1984 | Dills | |
| 4,494,525 A | 1/1985 | Albertsen | |
| 4,516,012 A | 5/1985 | Smith et al. | |
| 4,737,373 A | 4/1988 | Forney | |
| 4,752,268 A | 6/1988 | Kataoka et al. | |
| 4,786,774 A | 11/1988 | Kaminaka | |
| 4,849,597 A | 7/1989 | Waigand | |
| 4,924,763 A | 5/1990 | Bingham | |
| 4,949,629 A | 8/1990 | Leary et al. | |
| 4,958,412 A | 9/1990 | Stanek | |
| 4,965,435 A | 10/1990 | Smith et al. | |
| 5,021,621 A * | 6/1991 | Demmer et al. | 219/726 |
| 5,025,775 A | 6/1991 | Crisp | |
| 5,147,994 A * | 9/1992 | Smith et al. | 219/679 |
| 5,161,889 A | 11/1992 | Smith et al. | |
| 5,166,487 A | 11/1992 | Hurley et al. | |
| 5,277,105 A | 1/1994 | Bruno | |
| 5,369,250 A | 11/1994 | Meredith | |
| 5,401,940 A | 3/1995 | Smith et al. | |
| 5,676,870 A | 10/1997 | Wassman et al. | |
| 5,717,192 A | 2/1998 | Dobie et al. | |
| 5,825,000 A | 10/1998 | Jun | |
| 5,826,496 A * | 10/1998 | Jara | 99/443 C |
| 5,927,265 A | 7/1999 | McKee et al. | |
| 5,934,178 A | 8/1999 | Caridis et al. | |
| 5,994,672 A | 11/1999 | Mestnik | |
| 6,012,442 A | 1/2000 | Faraj | |
| 6,058,924 A | 5/2000 | Pool et al. | |
| 6,060,701 A | 5/2000 | McKee et al. | |
| 6,114,664 A | 9/2000 | Cook et al. | |
| 6,250,296 B1 | 6/2001 | Norris et al. | |
| 6,369,360 B1 | 4/2002 | Cook | |
| 6,376,817 B1 | 4/2002 | McFadden | |
| 6,399,930 B2 | 6/2002 | Day et al. | |
| 6,403,937 B1 | 6/2002 | Day et al. | |
| 6,437,303 B1 | 8/2002 | Dorr et al. | |
| 6,472,640 B2 | 10/2002 | Brown et al. | |
| 6,481,999 B2 * | 11/2002 | Knost | 99/443 C |
| 6,655,373 B1 | 12/2003 | Wiker | |
| 6,712,063 B1 | 3/2004 | Thorneywork | |
| 6,713,741 B2 | 3/2004 | Miller | |
| 6,854,456 B1 | 2/2005 | Friedrich et al. | |
| 6,874,495 B2 * | 4/2005 | McFadden | 126/21 A |
| 6,909,078 B2 | 6/2005 | Lee et al. | |
| 7,055,518 B2 | 6/2006 | McFadden | |
| 7,087,872 B1 | 8/2006 | Dobie et al. | |
| 7,360,533 B2 | 4/2008 | McFadden | |
| 7,424,848 B2 | 9/2008 | Jones et al. | |
| 7,507,938 B2 | 3/2009 | McFadden | |
| 7,836,874 B2 | 11/2010 | McFadden | |
| 7,836,875 B2 | 11/2010 | McFadden et al. | |
| 8,006,685 B2 | 8/2011 | Bolton et al. | |
| 8,035,062 B2 | 10/2011 | McFadden et al. | |
| 2001/0054605 A1 | 12/2001 | Suzuki et al. | |
| 2002/0023911 A1 | 2/2002 | Bales et al. | |
| 2004/0118392 A1 | 6/2004 | McFadden | |
| 2004/0123858 A1 | 7/2004 | McFadden | |
| 2004/0211765 A1 | 10/2004 | McFadden | |
| 2004/0216732 A1 | 11/2004 | McFadden | |
| 2005/0039613 A1 | 2/2005 | Kaminaka et al. | |
| 2005/0211775 A1 * | 9/2005 | Vaseloff et al. | 235/385 |
| 2005/0217503 A1 | 10/2005 | McFadden | |
| 2006/0169272 A1 | 8/2006 | McFadden et al. | |
| 2007/0137633 A1 | 6/2007 | McFadden | |
| 2007/0194011 A1 | 8/2007 | McFadden | |
| 2007/0295322 A1 | 12/2007 | Dobie et al. | |
| 2008/0099008 A1 | 5/2008 | Bolton et al. | |
| 2008/0105133 A1 | 5/2008 | McFadden et al. | |
| 2008/0105135 A1 | 5/2008 | McFadden et al. | |
| 2008/0105136 A1 | 5/2008 | McFadden | |
| 2008/0105249 A1 | 5/2008 | McFadden et al. | |
| 2008/0106483 A1 | 5/2008 | McFadden et al. | |
| 2008/0216812 A1 | 9/2008 | Dougherty | |
| 2008/0296284 A1 | 12/2008 | McFadden et al. | |

FOREIGN PATENT DOCUMENTS

| | | |
|---|---|---|
| EP | 0 096 159 | 12/1983 |
| EP | 0429822 | 6/1991 |
| EP | 429822 | 6/1991 |
| EP | 0534787 | 3/1993 |
| GB | 2043237 | 10/1980 |
| JP | 63-317068 | 12/1988 |
| JP | 0236824 | 2/1990 |
| JP | 2000254001 | 9/2000 |
| WO | WO-9836619 | 8/1998 |
| WO | WO 2004/014139 | 2/2004 |
| WO | WO 2005/041672 | 5/2005 |
| WO | WO 2005/087009 | 9/2005 |
| WO | WO 2006/041814 | 4/2006 |
| WO | WO 2006/081202 | 8/2006 |
| WO | WO-2006099394 | 9/2006 |
| WO | WO2009058934 | 5/2009 |

OTHER PUBLICATIONS

U.S. Appl. No. 12/045,063, filed Mar. 10, 2008, Dougherty.
Partial International Search report in related Application No. PCT/US2008/056358.
Office Action dated Oct. 3, 2008 in related U.S. Appl. No. 10/591,074.
Office Action dated Aug. 19, 2008 in related U.S. Appl. No. 11/663,253.
Office Action dated May 30, 2007 in related U.S. Appl. No. 10/614,268.
Response dated Nov. 30, 2007 in related U.S. Appl. No. 10/614,268.
Office Action dated Feb. 4, 2008 in related U.S. Appl. No. 10/614,268.

(56) References Cited

OTHER PUBLICATIONS

Response dated Aug. 4, 2008 in related U.S. Appl. No. 10/614,268.
Office Action dated Aug. 13, 2007 in related U.S. Appl. No. 10/576,847.
Response dated Feb. 12, 2008 in related U.S. Appl. No. 10/576,847.
Office Action dated Apr. 24, 2008 in related U.S. Appl. No. 10/576,847.
Response dated Oct. 7, 2008 in related U.S. Appl. No. 10/576,847.
Office Action dated Sep. 4, 2007 in related U.S. Appl. No. 11/392,050.
Response dated Mar. 6, 2008 in related U.S. Appl. No. 11/392,050.
Office Action dated Jul. 22, 2008 in related U.S. Appl. No. 11/392,050.
Office Action dated Jan. 25, 2005 in related U.S. Appl. No. 10/614,532.
Response dated Jun. 27, 2005 in related U.S. Appl. No. 10/614,532.
Office Action dated Sep. 22, 2005 in related U.S. Appl. No. 10/614,532.
Response dated Mar. 22, 2006 in related U.S. Appl. No. 10/614,532.
Office Action dated Apr. 7, 2006 in related U.S. Appl. No. 10/614,532.
Response dated Oct. 10, 2006 in related U.S. Appl. No. 10/614,532.
Office Action dated Jan. 11, 2007 in related U.S. Appl. No. 10/614,532.
Response dated Jul. 11, 2007 in related U.S. Appl. No. 10/614,532.
Office Action dated Sep. 27, 2007 in related U.S. Appl. No. 10/614,532.
Response dated Mar. 27, 2008 in related U.S. Appl. No. 10/614,532.
Office Action dated Jul. 23, 2008 in related U.S. Appl. No. 10/614,532.
Response dated Dec. 30, 2010 in U.S. Appl. No. 11/928,037.
Office Action dated Aug. 4, 2011 in U.S. Appl. No. 10/614,532.
Response dated May 2, 2011 in U.S. Appl. No. 10/614,532.
Notice of Appeal dated Dec. 21, 2011 in U.S. Appl. No. 10/614,532.
Notice of Allowance dated Apr. 1, 2011 in U.S. Appl. No. 11/663,253.
Noitce of Allowance dated Mar. 28, 2011 in U.S. Appl. No. 11/928,037.
Office Action dated Oct. 11, 2011 in Japanese Patent Application No. 2008-501955.
Office Action dated Nov. 4, 2010 in European Patent Application No. 03759175.
Rueggeberg, "A Multislotted Waveguide Antenna for High-Powered Microwave Heating Systems," IEEE Transactions on Industry Applications, Nov. 6, 1980, IA16(6), 809-813.
PCT/US2008/056358 Partial International Search Report dated Jul. 15, 2008.
EP 04816933 Supplementary Search Report dated Mar. 4, 2009.
U.S. Appl. No. 11/663,253 Request for Continued Examination filed Jul. 15, 2010.
U.S. Appl. No. 11/928,037 Non-Final Office Action dated Aug. 31, 2010.
U.S. Appl. No. 10/614,532 Final Office Action dated Oct. 13, 2010.

* cited by examiner

AIR FRYER

CROSS REFERENCE TO RELATED APPLICATIONS

The present application is the U.S. national phase of International Application No. PCT/US2006/009075 filed on 14 Mar. 2006 and published in English on 21 Sep. 2006 as International Publication No. WO 2006/099394 A1 which application claims priority to U.S. Provisional Application No. 60/661,591 filed 14 Mar. 2005 entitled "AIR FRYER"; claims priority to International Application No. PCT/US2005/035605 filed 5 Oct. 2005; and claims priority to U.S. application Ser. No. 11/098,280 filed 4 Apr. 2005.

Upon entry into the National Stage in the United States of America, the present application will be a continuation-in-part of U.S. application Ser. No. 11/098,280 filed 4 Apr. 2005; will be a continuation-in-part of U.S. application Ser. No. 10/614,268 filed 7 Jul. 2003; will be a continuation-in-part of U.S. application Ser. No. 10/614,532 filed 7 Jul. 2003; and will be a continuation-in-part of U.S. application Ser. No. 10/614,710 filed 7 Jul. 2003.

The present application contains technical disclosure in common with International Application No. PCT/US2003/021225 filed 5 Jul. 2003; contains technical disclosure in common with International Application No. PCT/US2005/007261 filed 7 Mar. 2005; contains technical disclosure in common with U.S. Provisional Application No. 60/394,216 filed 5 Jul. 2002; contains technical disclosure in common with PCT/US2004/035252 filed 21 Oct. 2004; contains technical disclosure in common with U.S. Provisional Application No. 60/513,110 filed 21 Oct. 2003; contains technical disclosure in common with U.S. Provisional Application No. 60/513,111 filed 23 Oct. 2003; contains technical disclosure in common with U.S. Provisional Application No. 60/614,877 filed 30 Sep. 2004; contains technical disclosure in common with U.S. Provisional Application No. 60/551,268 filed 8 Mar. 2004; contains technical disclosure in common with U.S. Provisional Application No. 60/615,888 filed 5 Oct. 2004; and contains technical disclosure in common with U.S. Provisional Application No. 60/550,578 filed 5 Mar. 2004.

All or the applications set forth above are incorporated herein by reference as if fully set forth.

TECHNICAL FIELD

The present invention relates to a recirculating air fryer which is particularly useful in cooking food products to a taste, texture and appearance level consistent with foods that have historically been deep fat fried in oil, lard or fat.

DESCRIPTION OF THE PRIOR ART

The invention relates to air fryer that is an improvement of deep fat frying. In restaurant operations deep fat fryers are traditionally used to cook french fries and numerous other food products (e.g., chicken, onion rings). These food products can be prepared from frozen, refrigerated, ambient, or above ambient temperature conditions. A typical high efficiency deep fat fryer used in such a fast food environment cooks about 1½ lbs (0.68 kilograms) of frozen 0.25 inch (0.64 centimeters) fries in about 3 minutes and 30 seconds. The through-put for such a deep fat fryer is about 60 pounds/hr (27.22 kg/hr).

Consumers place a high value on healthier foods that are prepared using less oils or fats and the replacement of the deep fat frying process with air frying eliminates a significant amount of oil and fat absorption into the food product. But, while consumers desire healthier foods prepared with less fat and oil, they still desire the taste, texture and mouth feel associated with the deep fat frying process.

SUMMARY OF THE INVENTION

It has now been found that the above objects are obtained in an air fryer employing gas flow to cook, or re-thermalize a food product. The gas flow to the rood product is such that conflicting and colliding gas flows produce high heat transfer at the food product surface. The air fryer may also utilize microwave energy, or other means such as radio frequency, induction and other thermal means, to further heat the food product. Microwave producing magnetrons are used with side wall mounted microwave waveguides employing the use of slotted antenna, although it is not necessary that the microwave system launches from the air fryer cavity side walls and indeed launching microwaves from other air fryer cavity surfaces may be employed. The air fryer may operate as a conventional speed, an accelerated speed or a speed cooking air fryer and the accelerated cooking air fryer is described herein as an exemplary embodiment or version. Gas flow and microwave energies (when microwaves are used) are distributed to the food product in a manner that produces uniform cooking and heating and a typical cook cavity temperature range may be in the approximately 375° F. (190 degrees Celsius "C") to approximately 500° F. (260° C.) range, although cook cavity temperatures below 375° F. (190° C.) and above 500° F. (260° C.) may be utilized. Cooking controls permits a wide variety of food products to be run sequentially through the air fryer with each food product having a unique cooking profile, or recipe, that may be executed in a sequential format as the food product moves into and out of the cooking cavity.

The present invention provides all air fryer that can prepare 'fry' foods without the need for deep fat flying of the food product. The air fryer is a fry system that may also include: (1) a frozen, refrigerated, ambient above ambient temperature, or combinations of temperature automatic food dispensing unit; (2) an air fryer for cooking and/or rethermalizing the food; and (3) an oil spray apparatus to lightly coat the food product in order to provide the taste, texture and appearance characteristics (without significant additional oil) consumers desire.

The air fryer matches the current leading deep fat fryers with respect to through-put, produces a single 1.5 lb (0.68 kg) load of frozen French fries in about half the time as compared to existing deep fat fryers and will require little oil for operation (i.e., no bulk shortening, lard) and therefore no hot oil filtering required). Indeed, one of the major drawbacks with deep fat fryers is the labor necessary to filter used oil and the safety issues associated with filtering and otherwise cooking (i.e. deep fat frying) with very hot oil.

Accordingly, it is an object of the present invention to provide a air fryer capable of cooking a broad variety of food products with varying size and volume profiles either at without the use of fat, lard or other traditional deep fat frying cooking medium.

A further object is to provide such an air fryer that is energy efficient, simple and safe to operate, simple and easy to clean, easily serviceable and has a low manufacturing cost.

Still another object is to provide such an air fryer that is capable of cooking high quality food product within metal food baskets and other metal cooking devices commonly found in residential, commercial, industrial and vending venues.

It is a further object to provide such an air fryer with a microwave distribution system which is more cost effective to manufacture and easy to clean and maintain.

Yet another object is to provide such a microwave distribution system that is reliable due to improvements and simplifications.

Still another object is to provide such an air fryer that can be easily and quickly programmed by an operator to cook various food products with the touch of a button or such an air fryer that automatically inputs cooking recipes into a controller without human intervention.

Additional objects, features and advantages of the present invention will become readily apparent from the following detailed description of the exemplary embodiment thereof, when taken in conjunction with the drawings wherein like reference numerals refer to corresponding parts in the several views.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF THE EXEMPLARY EMBODIMENT

Figure 1:
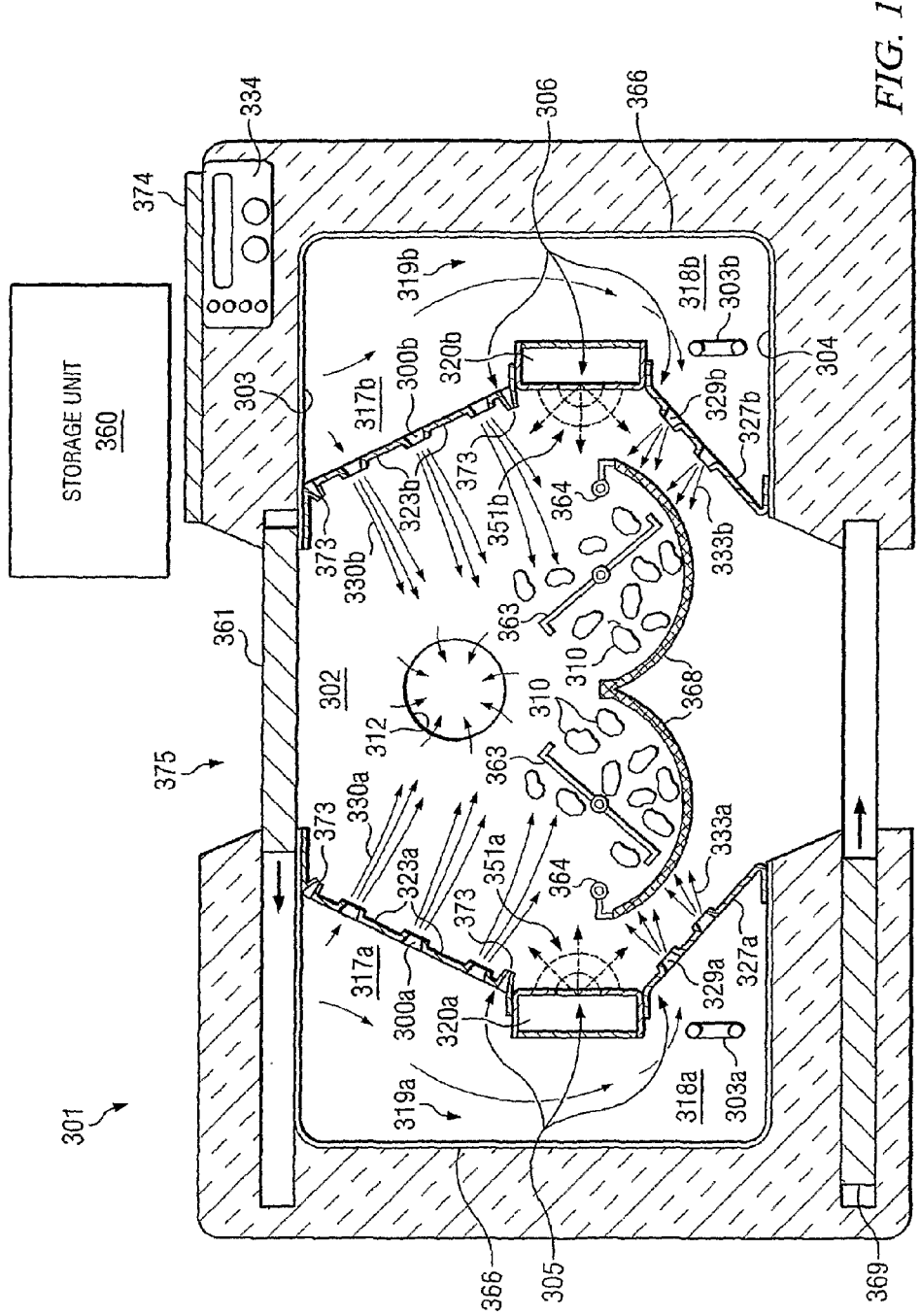
FIG. 1 is a front view of the air fryer of the present invention illustrating gas flow supply.

The air fryer of the exemplary embodiment is shown as a single cook cavity, accelerated cooking commercial air fryer but the air fryer may be built in other embodiments because it is scalable up or scalable down. The term "scalable" herein means that additional larger or smaller, faster or slower cooking versions may be developed, and each embodiment or version may have different size characteristics and utilize different voltages of electricity; various forms of electric resistance heating means, or utilize other thermal sources such as natural gas, propane or other thermal means to heat the gas.

As used herein the terms "magnetron", "magnetron tube" and "tube" have the same meaning; the terms "slot"; "slots" and "antenna" have the same meaning; the term "commercial" includes, but is not limited to the commercial food service industry, restaurants, fast food establishments, speed service restaurants, convenience stores (to list a few) and other mass feeding establishments; the term "residential" refers, generally speaking, to residential applications (home use), although the term is not limited to residences only, but refers to non-commercial applications for the air fryer and our air fryer is not limited to commercial uses only, and is equally applicable for vending, residential, industrial and other cooking uses; the terms "air fryer cavity", "air Fryer chamber" "cook cavity" and "cooking cavity" have the same meaning and the term "gas" refers to any fluid mixture, including air, nitrogen and other mixtures that may be used for cooking and applicant intends to encompass within the language any gas or gas mixture existing or developed in the future that performs the same function. The terms "conventional cooking" and "conventional means", have the same meaning and refer to cooking at the quality level and at the speed that is currently widely utilized. By way of example, in a deep fat fryer in use today, the "conventional cooking time" for one and one half pound (0.68 kg) of one quarter inch (0.64 cm) length french fries is approximately 3 minutes and 30 seconds, or approximately 60 pounds (27.22 kg) of french fries per hour. The terms "cooking profile" and "cooking recipe" have the sane meaning. The term "cooking by-products" refers to smoke, grease, vapors, small aerodynamic grease particles, odors, and other products caused by the cooking process and the term "odor filter" does not refer exclusively to filtering of odors, but instead refers generally to filtering, reduction of, removal of or catalytic destruction of by-products of the cooking process. The terms "cooking", "air frying" and "frying" have the same meaning herein.

As used herein, the term "rapid cooking" and "speed cooking" have the same meaning and refer to cooking at five to ten times faster, and in some instances more than 10 times faster than conventional cooking. The term "accelerated cooking" has the meaning of cooking at speeds faster than conventional cooking but not as fast as speed cooking.

The exemplary embodiment employs the use of a gravity led air fryer wherein the food product is dropped into the cooking chamber from above, although other means of introducing the food product into the air fryer chamber flay be utilized. The cooking time may be varied or fixed, may be altered either manually or by a controller 334, FIG. 1, and is not limited. Control of the energy applied to the food product is important particularly in those instances wherein the air fryer is to cook a variety of food products successively and the cooking profile, or cook recipe must be adjusted as the different food products enter the air fryer chamber. The air fryer may operate as a conventional, accelerated or speed cooking air fryer.

Appliance 301 includes cook cavity 302, FIG. 1. Cook cavity 302 is generally defined by a top wall 303, a bottom wall 304, a left side wall 305, right side wall 306 and FIG. 2 a back wall 307. Left wall 305 is comprised of top gas discharge plate 323a, microwave launcher 320a (when microwaves are utilized) and lower gas discharge plate 327a. Right side wall 306 is comprised of top gas discharge plate 323b, microwave launched 320b when microwaves are used) and lower gas discharge plate 327b, FIG. 1. In those instances wherein microwave energy is not utilized in the air fryer, left and right side walls 305 and 306 may be comprised of a sheet of metal in place of left and right waveguides 320a and 320b.

Appliance 301 may have associated therewith a food storage unit illustrated as remote storage unit 360, FIG. 1, which may utilize various means in order to transport food product 310 to food holding chamber 375, FIG. 1. A movable food storage isolation door 374 (shown in the open position) FIG. 1, and a movable upper air fryer isolation door (shown in the closed position) 361, FIG. 1 allow for the transport of food product from storage unit 360 to air fryer chamber 302. Food product 310, FIG. 1 is placed in food storage Unit 360), Which may be maintained at refrigerated, frozen, ambient, or above ambient temperature or in some cases, the food may be held in storage unit 360 at various temperatures. In those instances wherein microwave energy is used upper isolation door 361 forms a microwave seal with air fryer cavity 302. Although doors 361, 374 are shown (as well as door 369 to be discussed further herein) as movable horizontally relative to top wall 303, other door opening and closing means may be employed; such as side-hinged doors, top hinged doors or doors utilizing other attachment means or other opening and closing means such as an apertures, and applicant does not intend to be limited but rather intends to encompass within the language any structure presently existing or developed in the future that performs the same function as doors 361, 374 and 369.

The air dryer is comprised of two independent gas transfer systems, described herein as a left gas transfer system and a right gas transfer system, wherein left gas transfer system 317a delivers gas to and from the left side of cook cavity 302, FIG. 1, and right gas transfer system 317b delivers gas to and from the right side of cook cavity 302. Cook cavity 302 may also have associated therewith vent tube 371, FIG. 2, which allows for the passage of vent gas from cook cavity 302 to atmosphere. Affixed within vent tube 371 may be vent odor filter 372, which provides for the removal of cooking by-products. Vent odor filter 372 may be made to be removable for cleaning or replacement and various materials, including catalytic materials, may be utilized to accomplish odor removal. In some instances, varying efficiencies of said materials may also be employed in order to allow various amounts of odors to escape the air fryer cavity.

Referring again to FIG. 1, gas is transferred to cook cavity 302 via left gas transfer conduit 317a. In fluid connection with top gas transfer section 3117a is back wall gas egress opening 312, FIG. 1, which is open to, and in fluid connection with air fryer cavity 302 through back wall 307. Back gas egress opening 312 is substantially circular, although other geometries may be employed, and is located within back wall 307 and provides for the passage of gas from air fryer cavity 302 into return conduit means 389, FIG. 3 which returns gas from air fryer cavity 302 to gas flow means 316a, FIG. 2 as gases are removed from air fryer cavity 302 through back gas egress opening 312. Located within back gas egress opening 312 may be crease extractor 313, FIG. 2. As gas is drawn through gas egress opening 312 the gas passes across grease extractor 313, which remove, the larger grease particles. By extracting the larger grease particles managing grease build-up in the down stream conduits and heater area is simplified. It may be desirable for the cook cavity to utilize grease extractor 313, or alternatively no grease extractor, or still further additional grease extractors may be placed throughout the gas flow path. Gas then passes over heating means 314, FIG. 2.

During normal cooking it may be desirable for one food product to be cooked after another different type of food product with successive cycles continuing. For example a food product such as shrimp may be cooked first, followed by french fries. Without appropriate filtration, The cooking by-products may contaminate the potato product, producing an undesirable taste and odor in the fries. Although grease extractors 313 may be utilized, further gas filtration may be desirable and odor Filters 343, FIG. 2 may be placed within The cooking cavity or within gas conduit 389 upstream of blowers 316a, 316b to be discussed further herein, and may be made of various materials including catalyst materials such as a corrugated foil coated with catalyst, or catalyst coated screens. The catalyst acts to combust (oxidize) the cooking by-products. Such catalyst materials may also include, but is not limited to: activated charcoal, zeolite or ultra violet wavelight light. It is beneficial that the odor filters be comprised of a material, or materials, that effectively scrubs, or cleans the gas flow with a minimal amount of interference with the gas flow velocities and it is beneficial that the odor Filters be easily removed easily cleaned and inexpensive for the operator to replace. The most efficient utilization of the spent hot gas from cook cavity 302 is by re-circulation of the Gas through the filters and heaters and returned to air fryer cavity 302 during a cooking cycle. In some uses, it may be desirable to utilize additional odor filters, which may be placed anywhere within the gas flow path. Depending upon the various levels of cooking by-product control that may be desired depending upon the food products to be cooked, the particular use of the air fryer, or the requirements of regulatory agencies, or other factors, in order to minimize cooking by-products within air fryer cavity 302, the gas flow supply and return conduits may therefore include one odor filter or more than one odor filters.

As used herein the term "upstream" refers to a location within the gas flow path that comes before gas flow means 316a, 316b, 391a, 391b. For example, gas that is supplied to gas flow means 316a, 316b is upstream of gas flow means 316a, 316b and gas that is discharged from gas flow means 316a, 316b is downstream of said gas flow means. The exemplary embodiment illustrates gas flow means as blower wheels 391a, 391b, although our invention may utilize a single gas flow device, such as a single blower wheel and applicant intends to encompass within the language any structure presently existing or developed in the future that performs the same function as 316a, 316b. Blower wheels 391a, 391b act much like centrifugal separators that will separate and coalesce the small grease particles in the blower scroll area and discharge larger particles into the supply area.

Figure 6:
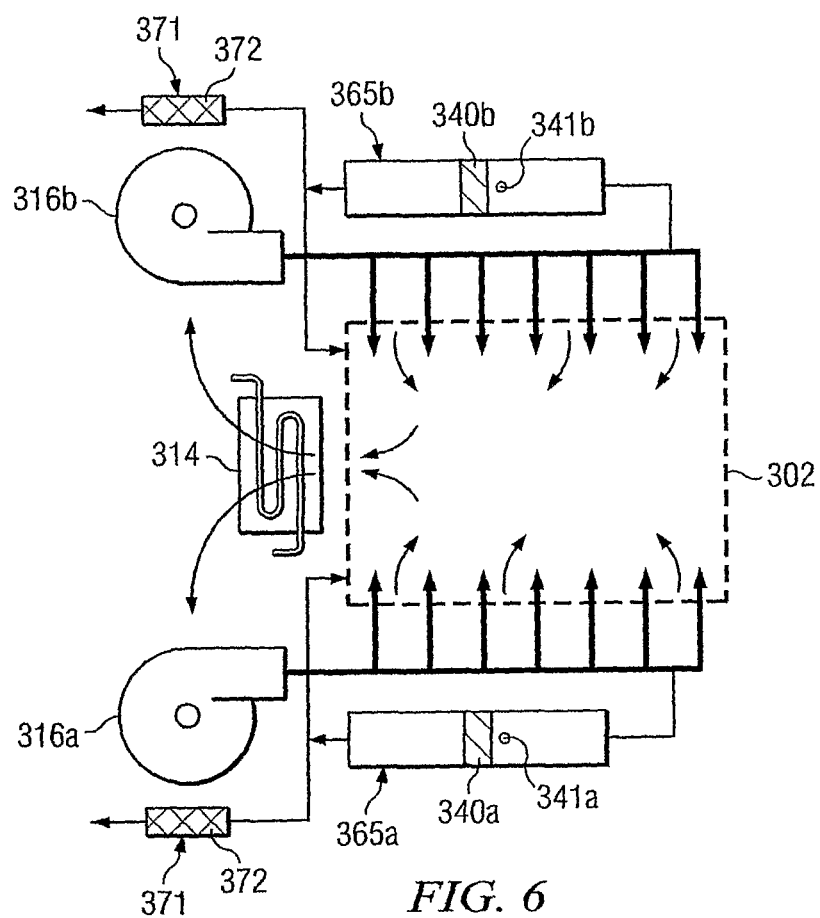
FIG. 6 is an illustrative top view of gas flow with catalyst system.

In an alternate embodiment, a portion of the gas flow leaving gas flow means 316a, 316b, 391a, 391b is diverted to the inlet side of gas bleed chamber 365a, 365b with odor filters 340a, 340b located within bleed chambers. The portion of gas flow diverted to said bleed chamber is referred to herein as the "bleed gas flow." The bleed gas flow passes through odor filter 340a, 340b FIG. 6 shown as a catalytic converter, where a portion of the cooking by-products is oxidized. Cleaner gas leaving odor filter 340a, 340b is either reintroduced into the gas flow stream or is vented to atmosphere via vent tube 371. Odor filter 340a, 340b will remove the desired amount of grease during a single pass as the small bleed gas flow will continually remove grease generated during cooking. Indeed, in some embodiments it may be desirable for the odor filter to remove all, or as much cooking by-product as possible. Varying destruction efficiencies of odor filter 340a, 340b will produce varying results and in those instances wherein odor filter 340a; 340b is of the catalytic type, destruction efficiencies of greater than 50% have shown to produce acceptable results. In some instances it may be desirable for odor filter 340a to be of a different variety or type than 340b. for example, one odor filter may be of a catalytic type and the other of a non-catalytic type. In some instances it may be desirable for odor filters 340a and 340b to catalyze or otherwise filter varying amounts of cooking by-products and therefore be made to destruct said by-products at differing rates. The bleed gas flow is configured as an internal cleaning gas loop operating separate from the main gas flow to air fryer cavity 302. In those instances wherein odor filter 340a, 40b is a high efficiency catalytic type filter for high cooking by-product destruction efficiencies, a large pressure drop may occur across odor filter 340a, 340b. Space velocities for the catalytic converter range are typically in the range between approximately 60,000/hr to 120,000/hr depending On the catalyst material utilized, the amount of cooking by-product loading in the gas stream and odor filter 340 inlet ambient temperature. Unlike the placement of odor filter 343 in the main gas flow which results in a significant pressure drop on the entire re-circulating gas flow, the use of bleed gas catalytic type filters, or other odor filters, does not significantly reduce gas flow system pressure. The small bleed gas flow utilizes nearly the entire pressure capability of the gas flow means through the gas bleed system, thereby permitting the use of catalytic materials required for a high destruction efficiency, based on one pass through odor filter 340. Additionally, the small bleed gas odor filters 340 are easily installed, can be placed in convenient locations and readily accessible. Bleed gas flows are a fraction of the main gas flow to the air fryer, therefore significant inlet gas temperature preheat may be achieved. Placing small gas pre-heaters 341*a*, 341*b*, FIG. 6 prior to odor filters 340*a*, 340*b* within the bleed gas flow system may additionally provide substantial improvement in the destruction efficiency of odor filter 340*a*, 340*b*. Pre-heaters 341*a*, 341*b* are capable of increasing the gas inlet temperature by greater than 100° F. (37.78° C.) and this temperature increase in the bleed gas to odor filter 340*a*, 340*b* makes it possible to achieve the desired destruction efficiency with less catalyst material. In some instances a main gas flow odor and cooking by-product clean-up system may have difficulty cleaning the gas when air fryer set point is under approximately 425° F. (218.3° C. Pre-heaters 341 are capable of producing cooking by-product control with air fryer temperatures below 350° F. (176.67° C.). Additional appliance flexibility is achieved by simultaneously permitting lower air fryer cook temperature setting while providing grease control.

The bleed gas flow is approximately 10% of the total gas flow, blowers 316*a*, 316*b*, and pre-heaters 341*a*, 341*b* would each provide approximately 600 watts of heat for a 100° F. (37.78° C.) rise in gas inlet temperature. The combined 1200 watts of heating is less than one third of the total heat required for each air fryer cavity of air fryer and is very close to the heat needed to satisfy standby losses of the air fryer (i.e., heat loss due to conduction, radiation, vent losses to ambient). As such, the pre-heaters can be the primary gas heaters with the larger (for this example 3000W) main gas heater used to satisfy cooking needs.

Figure 2:
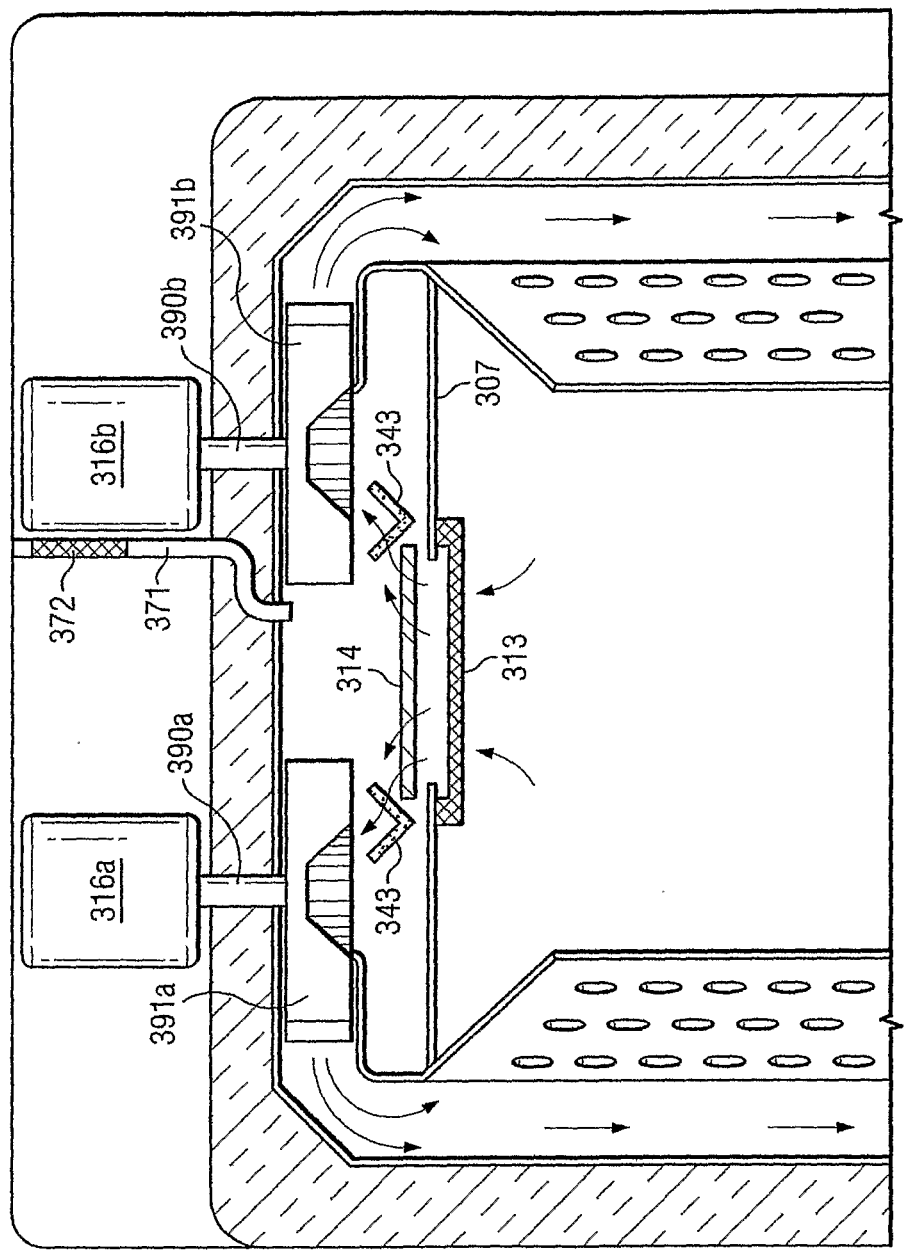
FIG. 2 is a top view of the air fryer.

As previously described, in fluid connection with, and located within return conduit means 389 is a left gas flow means, illustrated as left blower wheel 316*a*, 391*a*, FIG. 2. Our invention may utilize variable speed blower motors and variable speed blower motor controllers, but there is no requirement for their use and indeed the air fryer of the present invention may avoid the problems and complexity of variable speed blower motors by maintaining a constant gas flow, or alternatively, a substantially constant gas glow rate through the air fryer cavity. The gas flow may be very aggressive, or less aggressive, depending upon the cooking requirements for each food product and one means to achieve gas flow modulation is by use of a gas pumping Means such as a blower motor, blower wheel combination, utilizing a controller or a multi speed switch that allows for the switching of the blower motor speed in pre-determined fixed increments. Other gas flow means may be utilized to accelerate the gas flow, and applicant intends to encompass within the language any structure presently existing or developed in the future that performs the same function as 316*a*, 390*a*, 391*a* and 316*b*, 390*b* and 391*b*, to be discussed further herein. Connected to left blower wheel 391*a* is blower motor shaft 390*a*, which is direct drive with electric motor 316*a*, FIG. 2. Other means may be employed for coupling blower wheel 391*a* to electric motor 316*a*, such as belt drive and the drive means is not limited to direct drive and applicant intends to encompass within the language any structure presently existing or developed in the future that performs the same function. Blower wheel 316*a* takes gas from return conduit means 389 and delivers the gas via conduit 317*a* to air fryer cavity 302.

Left gas transfer section 317*a*, FIG. 1, is in fluid connection with a lower left gas transfer section 318*a* via a left vertical gas transfer section 319*a*. Left vertical gas transfer section 319*a* is bounded by left side wall 305 and a left microwave waveguide section 320*a*, when microwaves are used and outer wall 366. When microwaves are not used, waveguide launcher 320*a* may be replaced by metal. As can be seen in FIG. 1, as gas is supplied into top left gas transfer section 317*a*, the gas is discharged through a top left gas discharge plate 323*a* into air fryer cavity 302 via apertures 300*a* and onto the left top and left side portion of food product 310 which are contained within food baskets 364 to be discussed further herein. Apertures 300*a* may be slotted, regularly formed or irregularly formed apertures and are illustrated herein as nozzles 300*a* and 300*b*, 329*a*, 329*b*, FIG. 1, and applicant intends to encompass within the language any structure presently existing or developed in the future that performs the same function as 300*a*, 329*a* and 300*b* and 329*b*, discussed further herein. Gas that has not been discharged through top left gas discharge plate 323*a* flows to lower left gas transfer section 318*a* via vertical transfer section 319*a*. Gas that is distributed to lower left gas transfer section 318*a* may be re-heated, if desired, by a lower left heating means 303*a*, FIGS. 1,4,5, before said gas passes through slotted or perforated lower left gas discharge plate 327*a* via apertures 329*a*, for discharge onto the left bottom and left side portions of food product 310 in rotating screen food baskets 364, within air fryer cavity 302. Lower left heating means 303*a* may be present in some embodiments and not present in others depending upon the particular requirements for the air fryer. Although lower left heating means 303*a* is shown as an electric open coil heater, other means to heat the gas may be utilized such as other types of electric heating means, electric resistance elements, natural gas, propane or other heating means and applicant intends to encompass within the language any structure presently existing or developed in the future that performs the same function as 303*a* and 303*b* to be discussed further herein. Apertures 300*a* and 329*a* are sized for a low pressure drop, while providing and maintaining sufficient gas velocities in the range of approximately 2000 ft/minute (609.6 meters/minute) to approximately 6000 ft/minute (1828.80 meters/minute) to properly cook the food product as described herein. In some instances, velocities below 2000 ft/minute (609.6 meters/minute) or above 6000 ft/minute (1828.80 meters/minute) may also be utilized, depending upon the particular food product to be cooked, or a particular cooking recipe that the controller is executing, to be discussed further herein, and applicant does not intend to limit the invention to gas velocities within a particular range. Apertures 300*a* are sized such that the majority of the gas is supplied from top left gas discharge plate 323*a*. The resulting imbalance of gas flows between the top left gas discharge plate 323*a* and lower left gas discharge plate 327*a* is desirable because the top flows must aggressively remove moisture produced and escaping from the top and top side surfaces of the food product 310. The gas flow imbalance also serves to heat, brown and/or heat and brown the food product 310.

Referring again to FIG. 1, gas is transferred to the right of cook cavity 302 via a right gas transfer conduit 317*b*, FIG. 1. In fluid connection with top gas transfer section 317*b* is the previously described back gas egress opening 312, which is in fluid connection with return conduit means 389. Return conduit means 389 is in fluid connection with a right gas flow means, illustrated as right blower wheel 391*b*, FIG. 2. As with blower wheel 391*a*, other devices may be utilized for gas flow means 316*b*, 391*b* to accelerate the gas flow, and applicant intends to encompass within the language any structure presently existing or developed in the future that performs the same function. Connected to right blower wheel 391b is blower motor shaft 390b, which is direct drive with electric motor 316b, and as with electric motor 316a other means may be employed for coupling blower wheel 391b to electric motor 316b. Blower wheel 316b takes gas from air fryer cavity 302 via return conduit means 389, pulls the gas across healing means 314 and delivers the gas to top transfer section 317b.

Top right gas transfer section 317b, FIG. 1, is in fluid connection with a lower right gas transfer section 318b via a right vertical gas transfer section 319b. Right vertical gas transfer section 319b is bounded by right side wall 306 (and right microwave waveguide section 320b when microwaves are utilized) and outer wall 366. As can be seen in FIG. 1, as gas is supplied into top right gas transfer section 317b, the gas is discharged through a top right gas discharge plate 323b into air fryer cavity 302 via apertures 300b and onto the right top and right side portion of food product 310. Apertures 300b may be slotted, regularly formed or irregularly formed apertures and are illustrated herein as nozzles 300b and 329b, FIG. 1, and applicant intends to encompass within the language any structure presently existing or developed in the future that performs the same function as 300b and 329b. Gas that is distributed to lower right gas transfer section 318b may be re-heated, if desired; by a lower right gas heating means 303b, FIGS. 1, 4, 5 before said gas passes through slotted or perforated lower right gas discharge plate 327b via apertures 329b, for discharge onto the right bottom and right side portions of food product 310 in air fryer cavity 302. Lower right gas heating means 303b may be present in some embodiments and not present in others depending upon the particular requirements for the air fryer and as with gas heating means 303a, previously described, may be made of any material that accomplishes heating of the gas. Apertures 300b and 329b are sized for a low pressure drop, while providing and maintaining sufficient gas velocities in the range of approximately 2000 ft/minute (609.6 meters/minute) to approximately 6000 ft/minute (1828.8 meters/minute) to properly cook the food product as described herein. In some instances, velocities below 2000 ft/minute (609.6 meters/minute) and above 6000 ft/minute (1828.8 meters/minute) may also be utilized. Apertures 300b are sized such that the majority of the gas is supplied from the top right gas discharge plate 323b. As with the left gas system, the resulting imbalance of gas flows between the top right gas discharge plate 323b and lower right gas discharge plate 327b is desirable because the top flows must aggressively remove moisture produced and escaping from the top and top side surface of the food product 310. The imbalance also serves to heat, brown and/or heat and brown the food product 310.

The left and right gas supply systems, although independently described herein, are the same configuration and function to uniformly circulate hot gas flow across the top and top sides and bottom and bottom sides of the food product, and return the gas to the heating mechanism and gas flow means for re-delivery to the air fryer cavity. Although the same configuration is shown in the exemplary embodiment no requirement exists for this symmetry and the left gas supply system may be configured differently than the right supply system, and the top gas supply systems configured differently from the bottom. Indeed, each cook cavity may be configured differently than the other cook cavity and many combinations of configurations may be desirable for the particular air fryer.

As previously described, gas flow is delivered via four gas transfer sections 317a, 317b, 318b, 318b which are located in the top and bottom corners of each air fryer cavity 302 as shown in FIG. 1. Gas flow transfer sections 317a, 317b, 318a and 318b extend the width of each air fryer cavity 302, although it is not required that the gas flow transfer sections extend the entire length of the air fryer cavity. Gas transfer section 317a is located in the top left corner of air fryer cavity 302, FIG. 1, where top wall 303 intersects air fryer cavity left side wall 305; gas transfer section 317b in the top right corner where top wall 303 intersects right side wall 306; gas transfer section 318a in the lower left corner of the air fryer cavity 302 where bottom wall 304 intersects left side wall 305; and gas transfer section 318b in the lower right corner where bottom wall 304 intersects right side wall 306. Each gas transfer section is sized and configured to deliver the appropriate gas flow for the particular air fryer utilized. For example, in a smaller air fryer, the gas delivery sections, indeed the entire air fryer, may be sized smaller in proportion to the smaller footprint of the particular requirements, and a larger air fryer may have proportionally larger gas delivery sections.

As seen in FIG. 1, the left side and the right side gas flows converge on food product 310 creating an aggressive gas flow field on the food product surface that strips away the moisture boundary layer. This turbulently mixed gas flow directed at the food product can best be described as glancing, conflicting and colliding gas flow patterns that spatially average the gas flow over the surface area of the food product producing high heat transfer and moisture removal at the food product surface, thereby optimizing cooking. The gas flow is directed towards the top, the bottom and the sides of (the food product from the left and right sides of the air fryer cavity and the left and right side gas flows conflict, collide and glance off each other at the food product surface before exiting the air fryer cavity through back gas egress opening 312. As used herein the term "mixing" refers to the glancing) conflicting and colliding gas flow patterns that meet at and upon the top surface, the bottom surface and the left and right side surfaces of the food product and produce high heat transfer for both conventional and accelerated cooking of the food product due to spatial averaging of the gas flow heat transfer. The mixing gas flows patterns are created within the air fryer cavity and, when appropriately directed and deflected, produce a high quality cooked food product that can also be cooked very quickly. Although accelerated cooking of high quality food product may be accomplished with this invention, conventional and speed cooking may also be accomplished by adjusting the gas flow and microwave energy (in instances wherein microwave energy is utilized) to the food product; or by use of gas flow alone with no microwave energy, Enhancing the highly agitated, glancing, conflicting, and colliding gas flow is the general upward flow path the gas will follow prior to exiting cooking chamber 302 as shown in FIG. 1 through back gas egress opening 312, as the gas exits the back of air fryer cavity 302. This gas flow draws also the gas from lower gas discharge sections 318a and 318b thereby scrubbing the bottom of the food product by pulling gas flow around the sides of the food, further enhancing the heat transfer, as well as drawing the gas that scrubs the upper surface up towards the air fryer cavity back wall.

Returning to FIG. 1, top gas discharge plates 323a and 323b are positioned within air fryer cavity 302 such that the gas flow from top gas transfer section 317a conflicts and collides with the gas flow from top gas transfer section 317b upon the food product surface and a strikes the food product at an angle that is between zero degrees and 90 degrees as referenced from the horizontal top wall (where zero degrees is parallel to the horizontal top wall) and lower gas discharge plates 327a and 327b are positioned within air fryer cavity 302 such that the gas flow from lower gas transfer section 318a conflicts and collides with the gas flow from lower gas transfer section 318b upon the lower surface of the food product at an angle that is between zero degrees and ninety degrees as referenced from the horizontal bottom wall. Various cooking requirements may require that the angle of the gas discharge plates 323a, 323b, 327a and 327b be adjusted, either during manufacture, or adjustable Within the air fryer after manufacture, in order for the chef or cook to change gas flow velocity angles (vectors) to effect different cooking pro files.

The number and placement of the apertures 300a, 300b, 329a and 329b will vary according to the particular air fryer that is desired. The operator may desire more flexibility of cooking and in this circumstance gas discharge plates 323a, 323b, 327a and 327b may be fabricated in a manner that allows for quick change-out of the plates by the operator. As used herein the term "aperture" refers to irregular slots, irregular holes or irregular nozzles, regularly formed slots, regularly formed holes or regularly formed nozzles or a mixture of regularly formed and irregularly formed slots, holes or nozzles. FIG. 1 illustrates the use of three rows of apertures 300a and 300b on top gas delivery sections 317a and 317b, and two rows of apertures on the lower gas delivery systems 318a and 318b, although more or fewer rows and numbers of apertures may be utilized and applicant intends to encompass within the language any structure presently existing or developed in the future that performs the same function. The gas delivery system as illustrated in FIG. 1 produces aggressive glancing, conflicting and conflicting gas flow patterns 330a and 330b wherein an aggressive top glancing, conflicting and colliding gas flow pattern 330a also interacts with the left top portion and left top side portion of food product 310 and a similar right top glancing, conflicting and colliding gas flow pattern 330b interacts with the right top portion and top right side portion of food product 310. Aggressive glancing, conflicting and colliding gas flow 331a interacts with the lower left and side portions of the food product and gas flow 331b interacts with the lower right and side portions of the food product. This cooking profile creates high heat transfer capability by using the surface or the food product, as well as the interference of flow fields to minimize boundary layer growth. After the aggressive glancing and conflicting gas flow patterns 330a and 330b contact or strike the food product they are exhausted through back egress section 312 and cycle through the air fryer as described herein. The highly turbulent flow of the conflicting gas patters described herein has several benefits. First, the conflicting gas flow patterns create cook cavity gas flow that is averaged spatially, or a flow condition that tends to average out the high and lows in flow variation for a given point in the cook cavity greatly reduces the design complexity needed to impose a uniform flow field over a cooking cavity. In those instances where gas transfer sections 317a, 317b, 318a and 318b are in use, conflicting gas flows produce an "X" style gas flow wherein high heat transfer rates needed for air frying average the flow conditions over space and time, thereby producing uniform cooking and browning. Basket pivot points 364 allow for rotation of food screen baskets 368 by food product agitators 363. In some embodiments a single screen basket may be utilized and in other embodiments the air fryer may be comprised of more than one such basket.

The gas flow within the air fryer, as well as other functions of cooking appliance 301 are directed by controller 334, FIG. 1. Air flying of individual food products generally requires a separate cooking profile or recipe for that food product. The air fryer may be capable of cooking various food products successively, therefore the air fryer controls may track the food products as they are selected from food storage unit 360 and move through air fryer cavity 302, and adjust the gas flow energies, and microwave energies (when microwave energy is used) of the cook cavity according to the cooking recipe that has been input by the operator or input by a scanning device, or other device for each food product. The cooking profile for a food product, also referred to herein as the "cooking recipe" may be quite complex and time and labor expense associated with inputting cooking recipes may be minimized by use of controller 334 loaded with predetermined cooking recipes from a smart card, or loaded from an automated product identification device, or other scanning and reading devices may be utilized. Alternate embodiments will allow the operator to select the food product from food storage means 360, FIG. 1, and a unique product identification code could be used to transfer recipes to the air fryer controller, thereby eliminating manual cooking recipe input. Alternatively, manual single button entries, or multiple button entries may be made by the operator to input the cooking recipes and applicant does not intend limitations concerning the use of the control system for cooking recipes. Indeed optical scanners may be utilized. The exemplary embodiment describes a unique product identification code that is encoded with the correct cooking recipe settings for each food product and the transfer of information is accomplished using an Radio Frequency Identification ("RFID") tag placed on the food, food container or food packaging. The RFID tag may be programmed from the restaurant point of sale system and read by the air fryer controller by any means known such as cable linked one way communication, two way communication, wireless or other means and applicant intends to encompass within the language any structure presently existing or developed in the future that performs the communication function. Reading of the RFID tag by controller 334 minimizes error associated with the operator imputing an incorrect air fryer cooking recipe and allows a restaurant to optimize customer service as the air fryer controller communicates with the point of sale system during the cooking cycle for each food product. Controller 334 determines, among other things, the velocity of gas flow, which may be constant or varied, or, may be constantly varied throughout the cooking cycle and whether or not gas is delivered through the previously described cooking nodes to cook cavity 302. It may be desired to cook the food product on one velocity throughout the entire cooking cycle, or to vary the gas velocity depending upon conditions such as a predetermined cooking recipes, or vary the gas velocity in response to various sensors that may be placed within the cooking cavity, air fryer return gas paths or various other positions within the air fryer. The location and placement of said sensors will be determined by the particular application of the air fryer. Additionally, other means may be utilized wherein data is transmitted to controller 334, and thereafter controller 334 adjusts the cooking recipe in an appropriate manner. For example sensors (temperature, humidity, velocity, vision and gas borne chemical mixture level sensors) may be utilized to constantly monitor the cooking conditions and adjust the gas flow, and microwave energy, when used, accordingly within a cooking cycle, and other sensors not described herein may also be utilized and the air fryer may utilize sensors that are not currently commercially practical clue to cost or other limitations (such as laser, non-invasive temperature sensors and other sensors that are currently too expensive to be commercially feasible), and the air fryer is not limited to those discussed herein, as many sensing devices are known and utilized in and applicant intends to encompass within the language any structure presently existing or developed in the future that performs the same function. Additionally, controller 334 may control the amount of bleed gas flow through each odor filter 340*a*, 34*b*, as previously described. For example, air fryer cavity 302 may contain a food product that, upon conventional cooking, or accerated cooking, will produce larger amounts of airborne grease, smoke and odor. In such an instance, controller 334 may allow for more gas flow to pass through odor Filter 340*a*, 340*b* of air fryer cavity 302 and to adjust pre-heaters 341*a*, 341*b*.

Gas flow may also be adjusted as a function of available power. In the event, for example, the heating means of an all electric air fryer is requiring or utilizing a large amount of power (larger than available power levels which may vary according to location and local code and ordinance) it may be desirable for controller 334 to reduce electrical power to the heating means or other electrical components in order to conserve available power. In the air fryer, some systems may be powered by electric current, but the electric power requirements will not be as high as required for an all electric air fryer because the energy required for gas heating and cooking will be provided by the combustion of a hydrocarbon based fuel. In this event a controller may not be required, indeed knobs or dials may be utilized.

Figure 4:
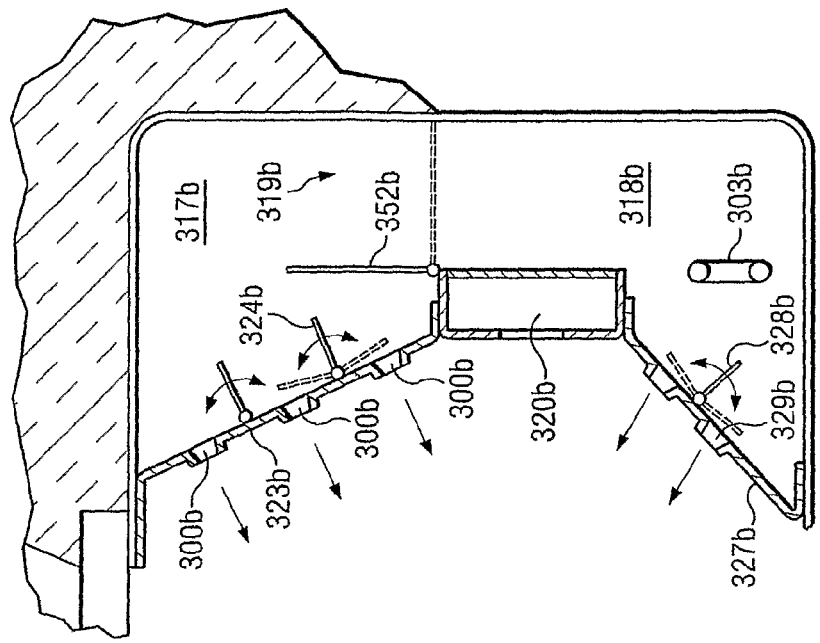
FIG. 4 is a Front view of the left side of air fryer illustrating gas flow deflecting means.
Figure 5:
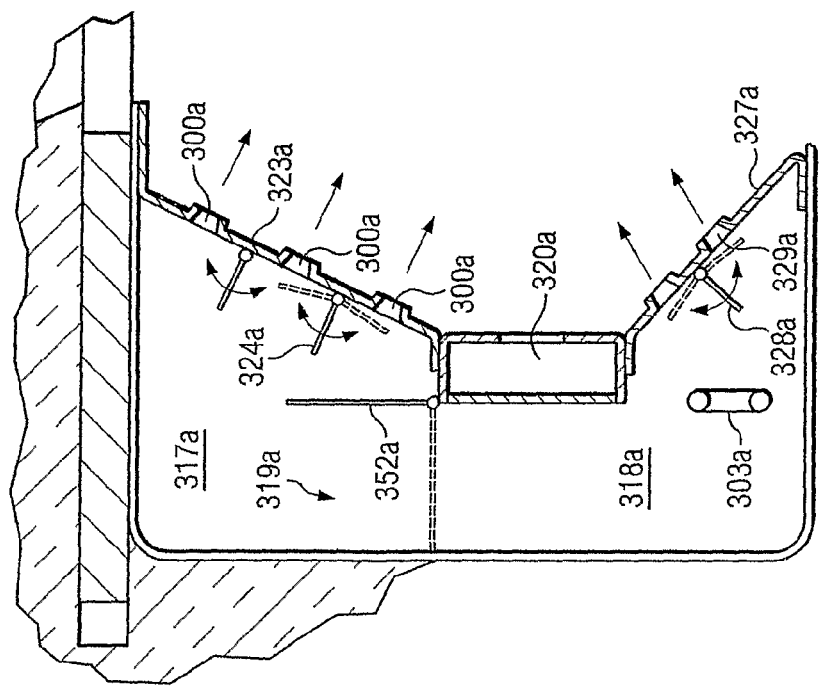
FIG. 5 is a front view of the right side of air fryer illustrating gas flow deflecting means.

In an alternate embodiment, gas flow control may be accomplished by gas flow control means, FIGS. 4, 5. As gas is discharged into top left gas transfer section 317*a*, a selected portion of said gas may be directed through apertures 300*a* within gas discharge plate 323*a* by gas deflecting means 324*a*, shown in the open position, FIG. 4. Gas deflecting means 324*a* is shown as pivotally attached to gas discharge plate 323*a*, although, other means for accomplishing said gas deflection may be utilized. For example means such as normally open, normally closed, or normally partially open and normally partially closed switched plates may be used (wherein said plates slide along the inside of perforated plate 323*a* to limit the aperture openings 300*a* of discharge plate 323*a*), and applicant intends to encompass within the language any structure presently existing or developed in the future that performs the same function as gas deflecting means 324*a*. Gas that has not been discharged or deflected through apertures 300*a* flows to lower left gas transfer section 318*a* via vertical transfer section 319*a*. Pivotally attached to waveguide section 320*a* (when waveguides are used and to sheet metal when not used) is a lower gas transfer deflection mechanism 352*a*. FIG. 4 that operates to limit the amount of gas that is transferred to lower gas transfer section 318*a*. As used herein, the terms "flow control means" "gas deflecting means" "transfer deflection mechanism" and "flow control means" all have the same meaning and refer to means to control gas flow within and to various parts of the air fryer. Indeed, certain cooking operations may call for more gas flow to the lower part of the air fryer, while other operations will call for little or no gas flow to the bottom side of the air fryer for delivery to the bottom of the food product. In those instances where little or no gas flow is desired upon the bottom surface of The rood product, gas transfer deflection mechanism 352*a* may be closed in order to allow all, or substantially all, of the gas flow into top left gas delivery section 317*a*.

Gas that flows to lower left gas delivery section 118*a* may be re-heated, if desired, by lower left heating means 303*a*, FIG. 4. After passing over heating elements 303*a*, the gas may be further deflected by deflecting means 328*a*, FIG. 4, shown in the open position. As gas defecting means 328*a* is rotated, directional control of the gas flow may be further refined, allowing for gas now to pass through the upper or lower rows of apertures or lower gas plate 327*a* at various positions along food product 310 bottom surface, FIG. 4. Although gas deflecting means 328*a* is shown as pivotally attached to left slotted or perforated gas discharge plate 327*a*, gas deflecting means 328*a* is not limited to the pivotally attached means illustrated herein, and as described elsewhere herein, applicant intends to encompass within the language any structure presently existing or developed in the future that performs the same function as gas deflecting means 324*a*, 352*a*, 328*a*, 324*b*, 352*b* and 328*b* to be discussed further herein.

As gas is discharged into top right gas transfer section 317*b*, a selected portion of said gas may be directed through apertures 300*b* within gas discharge plate 323*b* by gas deflecting means 324*b*, shown in the open position, FIG. 5. Gas deflecting means 324*b* is pivotally attached to gas discharge plate 323*b*, although as with 323*a*, other means for accomplishing said gas deflection may be utilized. For example means such as normally open, normally closed, or normally partially open and normally partially closed switched plates' may be used (wherein said plates slide along the inside of perforated plate 323*b* to limit the aperture openings 300*b* of discharge plate 323*b*), and applicant intends to encompass within the language any structure presently existing or developed in the future that performs the same function as gas deflecting means 324*b*. Gas that has not been discharged or deflected through apertures 300*b* flows to lower left gas transfer section 318*b* via vertical transfer section 319*b*, Shown as pivotally attached to waveguide section 320*b* (when waveguides are used and to sheet metal when not used) is a lower gas transfer deflection mechanism 352*b*, FIG. 5 that operates to limit the amount of gas that is transferred to lower gas transfer section 318*b*. As with the left gas transfer system, certain cooking operations may call for more gas flow to the lower part of the air fryers while other operations will call for little or no gas flow to the bottom side of the air fryer for delivery to the bottom of the food product. In those instances where little or no gas flow is desired upon the bottom surface of the food product, gas transfer deflection mechanism 352*b* may be closed in order to allow all, or substantially all, of the gas flow into top left gas delivery section 317*b*.

Gas that flows to lower right gas delivery section 118*b* may be re-heated, if desired, by lower left heating means 303*b*, FIG. 5. After passing over heating elements 303*b*, the gas may be further deflected by deflecting means 328*b*, FIG. 5, shown in the open position. As gas deflecting means 328*b* is rotated, directional control of the gas flow may be further refined, allowing for gas flow to pass through the upper or lower rows of apertures of lower gas plate 327*b* at various positions along rood product 310 bottom Surface, FIG. 5. Although gas deflecting means 328*b* is shown as pivotally attached to left slotted or perforated gas discharge plate 327*b*, gas deflecting means 328*b* is not limited to the pivotally attached means illustrated herein, and as described elsewhere herein, applicant intends to encompass within the language any structure presently existing or developed in the future that performs the same function as gas deflecting means 324*a*, 352*a*, 328*a*, 324*b*, 352*b* and 328*b*.

In those instances wherein directional control of the gas flow is desired, gas deflecting means 324*a*, 324*b*, 328*a*, 328*b* and 352*a* and 352*b*, FIGS. 4,5 may be rotated such that gas flow is diverted to selected apertures, thereby effecting a different gas flow pattern and gas mixing upon and above the food product surface. Additionally, in those instances wherein no bottom side gas now is desired, gas deflecting means 352*a*, 352*b*1 may be closed, whereby allowing for little or no passage of gas flow to the lower portion of the air fryer cavity. Various other adjustments of gas deflecting means are possible and applicant intends to encompass within the language any structure presently existing or developed in the future that allows for combinations of open and closed positions of apertures 300a, 300b, 329a and 329b by the various gas flow control means described herein. Gas deflecting means 324a, 324b, 328a, 328b and 352a and 352b may be manually controlled, automatically controlled via controller 334, controlled by other mechanical or electrical means, or controlled via combination of automatic and manual control and applicant intends to encompass within the language any structure presently existing or developed in the future that performs the function described herein concerning adjustment or the gas deflecting means. In those instances wherein gas deflecting means 324a or 324b allow little or no gas through gas discharge plates 323a, 323b, and further wherein little gas flow is desired through lower gas discharge plates 327a, 327b, a by-pass return gas flow conduit may be provided in order to return gas flow to gas return conduit means 389. Additionally, in those instances wherein gas directing means 328a, 328b allow little or no gas through gas discharge plates 327a, 327b and less gas flow is desired through gas discharge plates 323a, 323b, a conduit means may be provided to return gas flow to return conduit means 389, or alternatively to atmosphere or to gas bleed system previously described for further odor and grease clean-up. Indeed, various and multiple combinations of gas flow control exist, depending upon the particular air fryer that is desired and gas now may be directed to many and various apertures throughout the air fryer in order to accomplish the desired finished cooked product 310.

The air fryer of the present invention may also utilize microwave energy to at least partially cook the food product. Standard 2.45 GHz magnetron tubes may be used, producing a maximum power level for the air fryer of around 2000 watts (delivered to the food) or 1000 watts per tube. Matching the general microwave and convection heat transfer energy patterns such that uniform cooking conditions can be achieved on the top and bottom of the food product. As seen in FIG. 1, left side microwave launching waveguide 320a is attached within air fryer cavity 302 to left side wall 305 between top left gas discharge plate 323a and lower left gas discharge plate 327a. Right side microwave launching waveguide 320b is attached within air fryer cavity 302 to right side wall 306 between top right gas discharge plate 323b and lower right gas discharge plate 327b. The microwave waveguides are designed to distribute microwave power from magnetrons 100, FIG. 3, uniformly from the right to the left of air fryer cook cavity 302. The vertical distance above cavity bottom wall 304 of waveguides 320a and 320b is such that, under normal cooking conditions, approximately more than one third of the microwave energy is available below food product 310, with the balance of microwave energy available above food product 310. Waveguides 320a, 320b (with slotted antenna's) are positioned along the left and right cavity walls. The microwave feeds are centered above the basket level, slightly below as discharge plates 323a, 323b.

Figure 3:
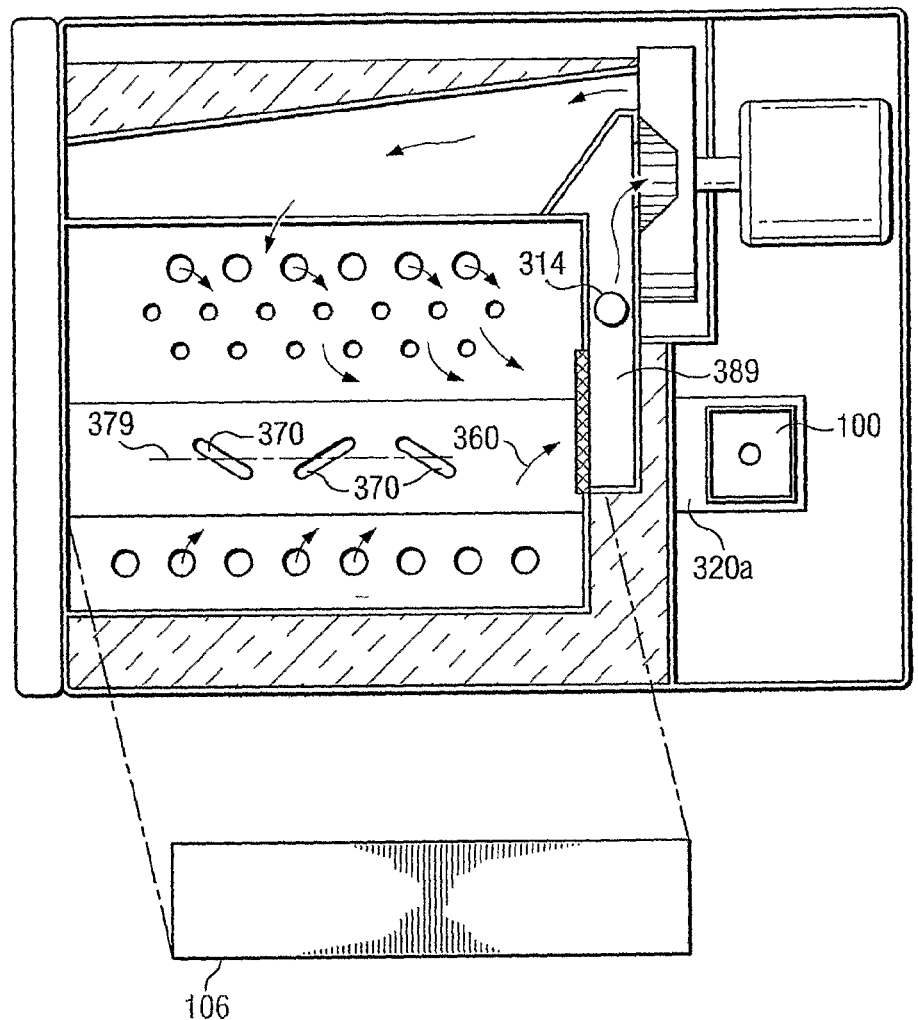
FIG. 3 is a side view of the air fryer

As shown in FIG. 1, microwave energy 351a, 351b, FIG. 5, is broadcast from waveguides 320a, 320b into air fryer cavity 302 via a slotted antenna 370, FIG. 3, wherein three or four narrow apertures (slots) 370 are spaced along the waveguide. Various configurations for microwave distribution have been utilized with varying results and less than three slots may be utilized or more than three slots may be used, and applicant intends to encompass within the language any structure presently existing or developed in the future that performs the same function.

Slots 370 in waveguides 320a, 320b, are open to the cooking cavity and must be covered or protected so that grease and other contaminants cannot enter the waveguide and a durable and inexpensive slot antenna cover may be utilized to protect such slots 370. Slot antenna covers 106 FIG. 3, are configured to cover slots 370 in waveguides 320a, 320b. Slot antenna covers 106 are adhered to the surrounding stainless steel of waveguides 320a, 320b using high temperature silicone rubber Room Temperature Vulcanizing ("RTV") sealant. This scaling approach creates high temperature watertight seal between the cover and the surrounding metal. Although an RTV sealant has been described in the exemplary embodiment, other sealant means may be utilized to adhere antenna covers 106 to waveguide 320a, 320b. The cover material must be compatible with high temperature operation, must be of low loss characteristics relative to microwave transmission, easily cleaned, durable, and inexpensive. For good microwave compatibility, materials with a dielectric constant less than 6 and a loss tangent less that 0.2 have been found to provide such characteristics. Such materials must be thin, generally less than 0.015 inches thick, and be suitable for gluing using (RTV). A Teflon (PolyTetraFluoroEthylene ("PTFE")/fiberglass fabric produced by Saint Gobain (Chem-Fab Product Number 10 BT) which has one side treated to accepted silicone rubber and is 0.01 inches thick is described in the exemplary embodiment and has shown to have little impact on the microwave characteristics or the magnetron and microwave waveguide system Results of impedance testing (Smith chart presentation) and water rise experiments of the impedance of the waveguide and waveguide antenna for slot angles greater than 17 degrees (as measured along center line, 379 FIG. 3 of slot 370) with and without antenna cover 106 are approximately the same.

Although two microwave waveguides, 320a, 320b and two magnetrons, 100, are described per cooking cavity, in other embodiments the waveguides may be supplied by one larger magnetron, or alternatively various numbers of magnetrons may be utilized and the invention is not limited to two magnetrons per cooking cavity and applicant intends to encompass within the language any structure presently existing or developed in the future that performs the same function.

For optimum air fry cooking, food product 310 is dropped into rotating screen food baskets 368, FIG. 1 in air fryer cavity 302. Screen baskets 368 are placed a distance of at least 2.4 inches (for optimal cooking uniformity) from left side wall 305 and right side wall 306. The 2.45 inch measurement corresponds to one half a microwave wavelength or 2.4 inches (for optimal cooking uniformity) (E field null) for a 2.45 GHz microwave tube (microwave) frequency. This spacing permits the E-field to expand and become more uniform prior to coupling with the food product. Other side spacing placement may be utilized with other types of magnetrons systems.

The right side microwave waveguide is identical to the left side system and microwave energy is broadcast from right waveguide 320b to air fryer cavity 302 via slotted antenna 370 as previously described for the left side. Although waveguides 320a and 320b are configured in the same manner, infinite combinations of slot designs, slot configurations, slot widths, slot lengths, numbers of slots per waveguides and slot orientations are possible per waveguide depending upon the type of air fryer desired. The microwave energy field therefore propagates through the air fryer cavity in an evenly distributed pattern, coupling with the food product from all directions, and providing an even electromagnetic energy distribution throughout the air fryer cavity without the need for a mechanical stirrer to propagate the electromagnetic field. Waveguides 320a and 320b are located on the left and right side walls of the air fryer, and therefore do not interfere with air fryer cavity spent gas exhaust. Because microwave waveguides are located on the side walls of the air fryer cavity, they are not affected by food spills, grease contamination, cleaning fluid contamination or other contamination that normally affect a bottom launch microwave system. The microwave system of the present invention will therefore be less likely to be penetrated by grease, spills, cleaning materials and other contaminants because the systems are not located directly under the food product where hot contaminants will drip. It is not required that side launch microwave waveguide be employed and indeed microwave launching may be accomplished from any air fryer cavity surface, with varying degrees of efficiencies. Microwave waveguides 320a, 320b, FIG. 1 with slotted antenna 370, FIG. 3, are positioned along the left and right cavity walls such that food baskets 368 are slightly below slots 370. In this manner, microwave energy is directed towards the top and bottom of the food product. For safety, microwave energy must be contained within cooking cavity 302 and air fryer cavity 302 is therefor fitted with microwave scaling lower isolation door 369, FIG. 1.

Exemplary food product flow is illustrated in FIG. 1. Food storage unit 360 dispenses portioned food to be prepared into air fryer cavity 302. Storage unit 360 may dispense bulk product or multiple products such as chicken, and fries. The storage unit dispenses a portioned amount of food product into closed food baskets 368 when upper air fryer isolation door 361 is in the open position. Food product may drop directly from storage unit 360 or alternatively, may be held in holding area 375. Once food product 31 has dropped into baskets 368, upper door 361 is closed and the cooking process begins. As used herein cooking includes re-thermalization. Microwave energy, if used, and convection heat transfer are controlled during the cook cycle. The convection energy is modulated via variable speed blower or flow control dampers as previously described, and the microwave is duty cycled to achieve the desired energy level. Food product agitators, one per basket in the exemplary embodiment 363, FIG. 1 stir layered products (e.g., layers of French fries) during the cook cycle. Before, during or after the cooking cycle, oil or oil mixtures, or other sprays may be sprayed or applied onto the food product by dispensers 373, FIG. 1. Upon completion of the cook cycle, lower air fryer door 369 opens and baskets 369 rotate open to dispense the cooked food product to a holding area below the air fryer cavity. Cook settings for product 310 may be inputted automatically or manually, as previously described, into controller 334. After door 361 closes, a second food product may be dropped into holding chamber 375. In those instances wherein microwave energy is used, a microwave seal must be achieved between air fryer cavity 302 and holding chamber 375 by previously described microwave door 361 made of a microwave reflecting material.

With first food product 310 in baskets 368, controller 334 begins the cooking recipe for food product 310 and a second food product may be selected and placed into holding chamber 375 wherein the second food product may receive defrost or pre-cooking warm-up, depending upon the cooking recipe chosen. Indeed, in some embodiments it may be desirable for isolation door 361 to be made of a microwave transparent material to allow microwaves to penetrate into holding chamber 375. In instances wherein microwaves are allowed to penetrate holding chamber 375, defrost of frozen cooking product may take place, or warm-up of cold but not frozen food products may begin. In instances where isolation door 361 is microwave transparent, door 374 must be microwave reflective and form a microwave seal with chamber 302. The second food product's cooking setting may now be entered into controller 334 in the event the operator had not previously entered the cooking program, or the program had not been automatically loaded as previously described. After cooking is completed, lower isolation door 369 opens, and food product is dispensed either below the air fryer into holding area or held for further cooking. Thereafter, door 369 is closed and cooking of the second food product resumes.

Although the exemplary embodiment illustrates the use of a two blower design with one blower providing the gas now to the left of each cook cavity and a second blower for gas flow to the right of each cook cavity, only one flow means, such as a blower may be utilized, or more than two gas flow means may be utilized and applicant intends to encompass within the language any structure presently existing or developed in the future that performs the same function.

Gas heating power requirements per cook cavity of the exemplary embodiment are between approximately 3 to 7 kw for an electric appliance and 12 to 30 Kbtu/h for a direct fired natural gas powered heater. For either power source, a standard temperature controller could be employed (i.e., maintaining the blower discharge temperature). For either a gas fueled or electric fueled appliance, as previously described, appliance 301 may be scaled to permit use of available power supplies. Additionally, a common gas heating means is ideal for ease of installation, service, and the ability to incinerate grease particles that come in contact with the very hot products of combustion, Of course, the hot products of cooking by-product combustion are mixed with the gas returning to the blowers, resulting in a modest gas temperature increase of between 20° F. (−6.67° C.) to 60° F. (15.56° C.) and a number of combustor types are suitable for this application including a surface type burner.

Although the present invention has been described in considerable detail with reference to certain preferred versions thereof, other versions are possible. For example, various sizes of air fryers, and various speeds of air fryers may be made in commercial, residential, industrial or vending embodiments. In These cases larger or smaller component parts may be utilized, and fewer or more components may be employed. In the case where it is desirable to make a smaller air fryer, one gas flow acceleration means may be utilized instead of two; one microwave system utilized instead of two; smaller or fewer thermal devices, whether electric resistance or gas fired may be used. In cases wherein it is desirable for a larger air fryer, larger gas flow systems and microwave systems may be added to accomplish cooking of more food product.

To summarize, the present invention provides for air frying utilizing substantially less or no oil by utilizing hot gas flow, or hot gas flow coupled with microwave energy in order to achieve air frying of food products to quality, taste and appearance levels equal to and higher than that attained by conventional cooking. The air fryer is operable on various power supplies and is simple and economical to manufacture, use and maintain, and is directly scalable to larger or smaller embodiments. The air fryer may operate as a gas Fired, electric resistance fired air flyer, a microwave air fryer or a combination gas and microwave air fryer. The air fryer may utilize means to inject or spray various oils, spices or other cooking additives onto the food product in order to provide a final food product that has the taste, texture and appearance characteristics of a deep fat fried food product. Additionally, the invention may be practiced wherein no gas deflection means are utilized, such as in the exemplary embodiment, gas deflection means are utilized as in alternate embodiments described herein.

Other modifications and improvements thereon will become readily apparent. Accordingly, the spirit and scope of the present invention is to be considered broadly and limited only by the appended claims, and not by the foregoing specification. Any element in a claim that does not explicitly state "means for" performing a specific function, or "step for"

performing a specific function, is not to be interpreted as a "means" or "step" clause as specified in 35 U.S.C. §112, ¶6. In particular, the use of "step of" in the claims herein is not intended to invoke the provisions of 35 U.S.C. § 112.

The invention claimed is:

1. An air fryer for cooking a food product having a top surface and a bottom surface, comprising:
   a housing defining a cooking chamber;
   a conduit for circulating gas to and from the cooking chamber;
   a blower for causing circulation of the gas;
   a heater for heating the gas;
   a first gas directing member disposed above the food product, the first gas directing member in fluid connection with the conduit; and
   a second gas directing member disposed above the food product, the second gas directing member also in fluid connection with the conduit;
   wherein the first and second gas directing members cause the gas from the first gas directing member to collide with the gas from the second gas directing member upon the top surface of the food product;
   a first lower gas directing member disposed below the food product; the first lower gas directing member in fluid connection with the conduit; and
   a second lower gas directing member disposed below the food product, the second lower gas directing member also in fluid connection with the conduit;
   wherein the first and second lower gas directing members cause the gas from the first lower gas directing member to collide with the gas from the second lower gas directing member upon the bottom surface of the food product;
   at least one pivotable food basket disposed within the cooking chamber for holding the food product, the at least one pivotable food basket secured within the cooking chamber at a basket pivot point that allows for rotation of the at least one food basket;
   at least one food product agitator mounted above the at least one pivotable food basket in order to contact and stir the food product while the food product is held in the at least one food basket; and
   an oil spray apparatus configured to deliver oil or an oil mixture to the food product.

2. The air fryer according to claim 1, further comprising:
   a right side food basket; and
   a left side food basket.

3. The air fryer according to claim 1, further comprising at least one basket pivot point against which the at least one food basket is allowed to rotate so as to allow the food product to be dumped out of the food basket.

4. The air fryer according to claim 1, wherein the at least one food product agitator comprises:
   a rotating paddle assembly.

5. The air fryer according to claim 1, wherein the oil spray apparatus is further configured to deliver a liquid or a dry seasoning.

6. The air fryer according to claim 1, wherein the oil or the oil mixture imparts to the food product a taste, a texture, and a feel of fried food.

7. The air fryer according to claim 1, further comprising:
   a top opening disposed on the top of the housing, the top opening provided in order to allow the food product to be placed into the cooking chamber from above.

8. The air fryer according to claim 1, further comprising:
   a bottom opening disposed on the bottom of the housing, the bottom opening provided in order to allow the food product to be emptied out of the cooking chamber.

9. The air fryer according to claim 1, further comprising:
   a food storage unit operably associated with the cooking chamber for holding the food product prior to the food product being introduced into the cooking chamber.

10. The air fryer according to claim 9, wherein the food storage unit comprises:
    an insulated chamber for maintaining the food product at a selected temperature.

11. The air fryer according to claim 9, wherein the food storage unit comprises:
    a microwave transparent portion in communication with the cooking chamber, whereby microwave energy may be passed from the cooking chamber into the food storage unit to selectively heat the food product in the food storage unit.

12. The air fryer according to claim 11, wherein the food product in the cooking chamber is cooked at least partially by microwave energy, while the food product in the food storage unit is thawed by the same microwave energy.

13. The air fryer according to claim 1, further comprising:
    a control system adapted to receive signals representing cooking instructions from a radio frequency identification system associated with a packaging associated with the food product.

14. An air fryer for cooking a food product, comprising:
    a housing defining a cook cavity;
    a blower for causing circulation of gas in the cook cavity;
    a heater for heating the gas;
    a left gas transfer system and a right gas transfer system, wherein the left gas transfer system and the right gas transfer system are configured to cause gas from the left gas transfer system to collide with gas from the right gas transfer system on surfaces of the food product;
    at least one pivotable food basket disposed within the cooking chamber for holding the food product, the at least one pivotable food basket secured at a basket pivot point that allows for rotation of the at least one food basket;
    at least one food product agitator mounted above the at least one pivotable food basket in order to contact and stir the food product while the food product is held in the at least one food basket; and
    a dispenser for dispensing an oil or an oil mixture to the food product while the food product is in the cook cavity in order to impart a taste, texture, or feel of fried food.

15. The air fryer according to claim 14, further comprising a right side food basket and a left side food basket.

16. The air fryer according to claim 14, further comprising at least one basket pivot point against which the at least one food basket is allowed to rotate so as to allow the food product to be dumped out of the food basket.

17. The air fryer according to claim 14, wherein the at least one food product agitator comprises a rotating paddle assembly.

18. The air fryer according to claim 14, further comprising an insulated food storage unit operably associated with the cook cavity for holding the food product and for maintaining the food product at a selected temperature prior to the food product being introduced into the cook cavity.

* * * * *